US010996703B2

(12) United States Patent
Nawy et al.

(10) Patent No.: US 10,996,703 B2
(45) Date of Patent: May 4, 2021

(54) OPEN AUTOMATED DEMAND RESPONSE (OPENADR) ENDPOINT DEVICE FOR MANAGING SYSTEM LOADS AND RESOURCES BASED ON ENERGY MARKET INDICATORS

(71) Applicant: IPKeys Technologies, LLC, Eatontown, NJ (US)

(72) Inventors: Robert Nawy, Lincroft, NJ (US); Jim Boch, Stafford, VA (US); Robert Womack, Acworth, GA (US)

(73) Assignee: IPKEYS POWER PARTNERS LLC, Eatontown, NJ (US)

( * ) Notice: Subject to any disclaimer, the term of this patent is extended or adjusted under 35 U.S.C. 154(b) by 946 days.

(21) Appl. No.: 14/957,046

(22) Filed: Dec. 2, 2015

(65) Prior Publication Data
US 2016/0162822 A1 Jun. 9, 2016

Related U.S. Application Data
(60) Provisional application No. 62/086,888, filed on Dec. 3, 2014.

(51) Int. Cl.
*G05F 1/66* (2006.01)
*G05B 15/02* (2006.01)
(Continued)

(52) U.S. Cl.
CPC ............... *G05F 1/66* (2013.01); *G05B 15/02* (2013.01); *G06Q 10/06312* (2013.01);
(Continued)

(58) Field of Classification Search
CPC .................. G05F 1/66; G06Q 30/0206; G06Q 10/06312; G06Q 30/04; G05B 15/02
See application file for complete search history.

(56) References Cited

U.S. PATENT DOCUMENTS

| | | | | |
|---|---|---|---|---|
| 5,924,486 A | * | 7/1999 | Ehlers | G05D 23/1923 165/238 |
| 6,633,823 B2 | | 10/2003 | Bartone et al. | |

(Continued)

FOREIGN PATENT DOCUMENTS

CN 103217900 A1 * 7/2013 ............. G05B 13/04

OTHER PUBLICATIONS

Shi et. al., "Evaluating Microgrid Management and Control with an Implementable Energy Management System", 2014, 2014 IEEE International Conference on Smart Grid Communications. (Year: 2014).*

(Continued)

*Primary Examiner* — Ziaul Karim
*Assistant Examiner* — Kelvin Booker
(74) *Attorney, Agent, or Firm* — Lowenstein Sandler LLP (57) ABSTRACT

Implementations of the disclosure describe an Open Automated Demand Response (OADR) endpoint device. A method of the disclosure includes receiving, by a processing device of an endpoint device, a first message comprising a first market energy price, determining whether a first quantity of energy has been consumed within a first time period by at least one energy device associated with the endpoint device, responsive to a determination that the first quantity of energy has been consumed by the at least one energy device within the first time period, determining whether the first market energy price is greater than a price threshold and responsive to a determination that the first market energy price is greater than the price threshold, causing the at least one energy device to stop consuming additional amounts of energy.

22 Claims, 5 Drawing Sheets

(51) Int. Cl.
*G06Q 30/04* (2012.01)
*G06Q 10/06* (2012.01)
*G06Q 30/02* (2012.01)

(52) U.S. Cl.
CPC ......... *G06Q 30/0206* (2013.01); *G06Q 30/04* (2013.01); *Y04S 10/50* (2013.01)

(56) References Cited

U.S. PATENT DOCUMENTS

| | | | |
|---|---|---|---|
| 7,135,956 B2 | 11/2006 | Bartone et al. | |
| 7,949,615 B2* | 5/2011 | Ehlers | H02J 3/14 705/412 |
| 8,311,863 B1* | 11/2012 | Kemp | G06Q 10/0639 705/7.11 |
| 9,063,525 B2* | 6/2015 | Sanders | G05B 11/01 |
| 9,146,548 B2* | 9/2015 | Chambers | G05B 15/02 |
| 9,369,305 B1* | 6/2016 | Nawy | H04L 51/04 |
| 9,471,946 B1* | 10/2016 | Keil | G05B 19/02 |
| 2011/0231320 A1* | 9/2011 | Irving | G06Q 30/00 705/80 |
| 2013/0035795 A1* | 2/2013 | Pfeiffer | G05B 15/02 700/276 |
| 2013/0085614 A1* | 4/2013 | Wenzel | G05B 13/021 700/277 |
| 2013/0166081 A1* | 6/2013 | Sanders | G05B 15/02 700/286 |
| 2013/0218355 A1* | 8/2013 | Lazaris | F03G 6/00 700/291 |
| 2014/0067150 A1 | 3/2014 | Songkakul et al. | |
| 2014/0249680 A1 | 9/2014 | Wenzel | |
| 2014/0277795 A1* | 9/2014 | Matsuoka | H04W 12/06 700/291 |
| 2014/0365164 A1 | 12/2014 | Fish et al. | |
| 2015/0155745 A1* | 6/2015 | Schuster | H02J 3/383 700/286 |
| 2016/0117657 A1* | 4/2016 | Forbes, Jr. | G06Q 30/0202 705/7.31 |
| 2017/0005515 A1* | 1/2017 | Sanders | H02J 3/14 |

OTHER PUBLICATIONS

Lee et al., "Fine-Grained Access to Smart Building Energy Resources", 2013, IEEE Internet Computing. (Year: 2013).*
Law et al., "Demand response architectures and load management algorithms for energy-efficient power grids: a survey", 2012, 2012 Seventh International Conference on Knowledge, Information and Creativity Support Systems, IEEE Computer Society. (Year: 2012).*
Larsen et al., "The Cobweb Effect in Balancing Markets with Demand Response", Jan. 2016, European Commission. (Year: 2016).*
Konstantinos Koliopoulos, "The OpenADR standard and development of new Demand Response algorithms in the Smart Grid", Nov. 2013, Hellenic University, School of Science and Technology, Master's Thesis. (Year: 2013).*
Anthony Abate, "Price Responsive Demand in New York Wholesale Electricity Market using OpenADR", Jun. 2012, Lawrence Berkeley National Laboratory. (Year: 2012).*
Kim et al., "Automated Price and Demand Response Demonstration for Large Customers in New York City using OpenADR", Oct. 2013, Lawrence Berkeley National Laboratory. (Year: 2013).*
Chan et al., "Load/Price Forecasting and Managing Demand Response for Smart Grids" , Aug. 2012, IEEE Signal Processing Magazine [68] Sep. 2012. (Year: 2012).*
International Search Report and the Written Opinion of the International Searching Authority dated Feb. 12, 2016, 3 pages.

* cited by examiner

OPEN AUTOMATED DEMAND RESPONSE (OPENADR) ENDPOINT DEVICE FOR MANAGING SYSTEM LOADS AND RESOURCES BASED ON ENERGY MARKET INDICATORS

RELATED APPLICATION

This application claims the benefit under 35 U.S.C. § 119(e) of U.S. Patent Provisional Application No. 62/086,888, filed on Dec. 3, 2014, the entirety of which is hereby incorporated by reference herein.

TECHNICAL FIELD

The present invention relates generally to a system and a method involving Open Automated Demand Response (OADR) communications, more particularly to providing an OADR endpoint device.

BACKGROUND

Demand Response (DR) is an established methodology for managing peak electrical demand by providing incentives to customers to reduce load on demand. An example of DR is a set of actions taken to reduce load when electric grid contingencies threaten supply-demand balance or market conditions occur that raise electricity costs.

DR plays a vital role in energy grid stabilization (for example, during hot summers) by easing severely-constrained electrical grids. Future energy crises caused by electricity demand exceeding system capacity may be postponed or even averted through DR. Automated Demand Response (ADR) is a systematic technology and communications platform that helps system operators reduce the operating costs of DR programs while improving DR resource reliability and consistency.

Open Automated Demand Response (OADR) is an open and standardized methodology for energy providers and system operators to communicate and convey energy market signals and DR signals with each other, and with their customers, using a common language. A typical use of OADR includes transmitting information and signals that cause electrical power-using devices to be turned off during periods of high demand. OADR information may be transmitted and received over an existing IP-based communications network, such as the Internet.

OADR version 2.0 (OADR 2.0) is a standard version of OADR that enables scaled deployments and interoperability within Smart Grid technologies. OADR 2.0 implements an open protocol that is compliant with the standards set forth by the Organization for the Advancement of Structured Information Standards (OASIS). OASIS is a global consortium that drives the development, convergence, and adoption of e-business and web service standards. The OASIS Energy Interoperation standard was created to provide a single format for energy market communications, based on the Extensible Markup Language (XML) system and protocol. These XML-based communications typically require an Internet connection to provide the link between energy providers and consumers. However, the required Internet connections are often difficult to implement and expensive to operate. Furthermore, certain businesses may not want their data to be transmitted over the internet, and may not want their internal networks connected to the outside world.

The concept of Price Responsive Demand (PRD) provides a mechanism for energy consumers to voluntarily reduce their consumption when prices rise in the market for electricity. PRD can assist an energy consumer to reduce or avoid energy payments during high price conditions, reduce or avoid the frequency and magnitude of energy scarcity events, and to increase operational efficiency by incorporating a price/quantity demand relationship into operations.

BRIEF DESCRIPTION OF THE DRAWINGS

The present disclosure is illustrated by way of example, and not by way of limitation, in the figures of the accompanying drawings.

DETAILED DESCRIPTION

Implementations of the present invention are directed to providing an Open Automated Demand Response (OADR) endpoint device. The OADR endpoint device can receive (e.g. via web services) messages including interoperable market signals at a client site (e.g., whole and retail clients) for processing and conveyance of the market signals to energy management systems and devices at the client site. The interoperable market signals may include demand response and price events. The OADR endpoint device can translate the received messages into various formats so that the signal values can be used at the client site to manage load and report usage and status.

In one implementation, an endpoint device may receive an OADR-conformant message that includes a value indicating a current market energy price. The endpoint device can also receive information related to an amount of energy consumption within a prior time period. In addition, the endpoint device can receive information related to the ambient temperature associated with the immediate surroundings of the endpoint device. In an implementation, the endpoint device can determine whether an energy consuming device that is associated with the endpoint device should shed load or reduce operations based on the current market energy price, the ambient temperature, and the amount of energy consumed within the prior time period.

Figure 1:
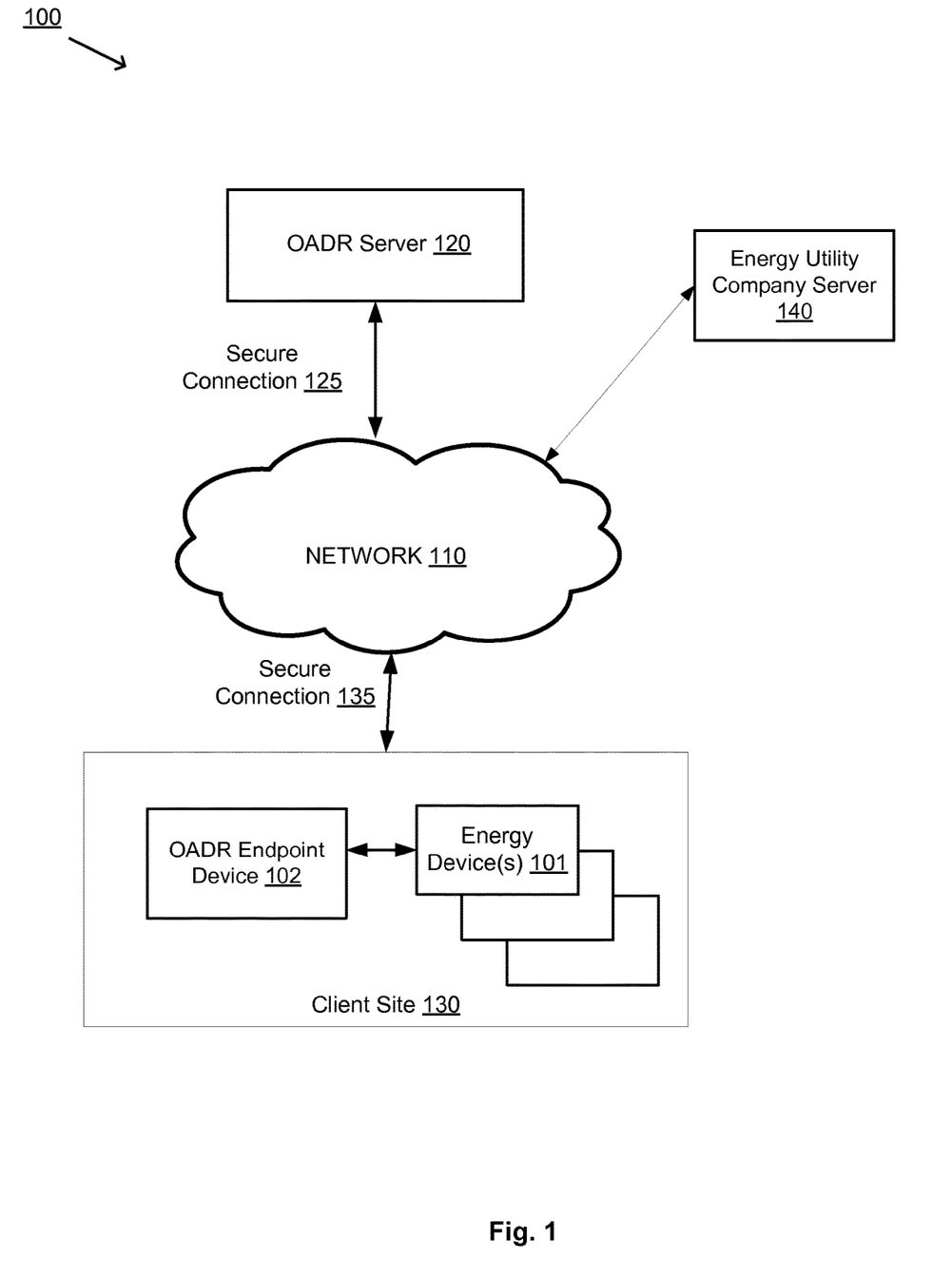
FIG. 1 is a block diagram of a system for an Open Automated Demand Response (OADR) endpoint device in accordance with implementations of the disclosure.

FIG. 1 is a block diagram of a networked environment system 100 for an OADR endpoint device in accordance with implementations of the disclosure. In one implementation, the OADR endpoint device 102, which may also be referred to as a Virtual End Node (VEN), is a device for managing and controlling an energy device 101 at a client site 130. The client site 130 may include one or more facilities of an organization or residence that utilizes energy consuming or producing services.

Energy device 101 may be any system or device that consumes or produces energy, for example, a heating, ventilation, and air conditioning (HVAC) system, a lighting system, and the like. The OADR endpoint device 102 may be directly integrated with the energy device 101 or may be separate from, but communicatively coupled to, the energy device 101. The OADR endpoint device 102 operates as a gateway designed to work with both simple and complex facility management systems, lighting controllers, distributed generation, cold storage, plug-in electric vehicle chargers, industrial controls, and so on. The OADR endpoint device 102 may include inputs (e.g., digital and analog inputs and outputs or dry contacts) that measure or receive a variable (e.g., temperature, humidity, or pressure) and may include outputs to control the energy consuming or producing system. In some implementations, the OADR endpoint client 102 may communicate via Modbus over IP.

In an implementation, the OADR endpoint device 102 includes a processor or a processing device that may process and facilitate sending, receiving, playing, and displaying messages that communicate OADR-based messages. As used herein, the term "processor" or a "processing device" is intended to include, but is not limited to, a programmable electronic machine that performs executes software to perform several operations such as assemble, store, correlate, or otherwise processes information.

The networked environment 100 further includes a network 110, which may be a local area network (LAN) or a wide area network (WAN) and/or may be a combination of one or more networks (e.g., the Internet, or a wired or wireless telephone network). In one implementation, network 110 includes any type of communications medium that allows for messages to be communicated to and from the OADR endpoint device 102.

Networked environment 100 may also include an OADR server 120. The OADR server 120 may also be referred to as a Virtual Top Node (VTN). In an implementation, the OADR server 120 may be any computing device that runs one or more services associated with the OADR endpoint device 102. Examples of services include, but are not limited to, providing access to OADR endpoint device 102 data, registering new OADR endpoint devices 102 and services, and providing administrative functions associated with the OADR endpoint device 102 to an OADR-conformant node associated with the OADR endpoint device 102. In one implementation, the OADR server 120 is located within or is part of an energy utility company server or system 140.

The OADR server 120 can be communicatively connected to the OADR endpoint device 102 via network 110. The OADR server 120 may include any transmitter and receiver components that are capable of communicating with the network 110. In an implementation, the OADR endpoint device 102 is configured to communicatively connect to the OADR server 120 via network 110. The OADR endpoint device 102 may include any transmitter and receiver components that are capable of communicating with the network 110. The OADR server 120 may be configured to communicatively connect to the network 110 via a secure connection 125. The secure connection 125 may be, but is not limited to, an internet connection made secure by provision of firewall security to prevent hackers, snoopers or spam-mail senders, or via encryption of messages, typically used for a virtual private network (VPN). In an implementation, the VTN server 120 communicates with the network 110 via a wireless connection using network protocols and a communications protocol module such as, for example, a communications protocol module for code division multiple access (CDMA) and for global system for mobile (GSM).

Similarly, OADR endpoint device 102 may be configured to communicatively connect to the network 110 via another secure connection 135. The secure connection 135 may be, but is not limited to, an internet connection made secure by provision of public key infrastructure (PKI) security to prevent hackers, snoopers or spam-mail senders, or via encryption of messages, typically used for a virtual private network (VPN).

Figure 2:
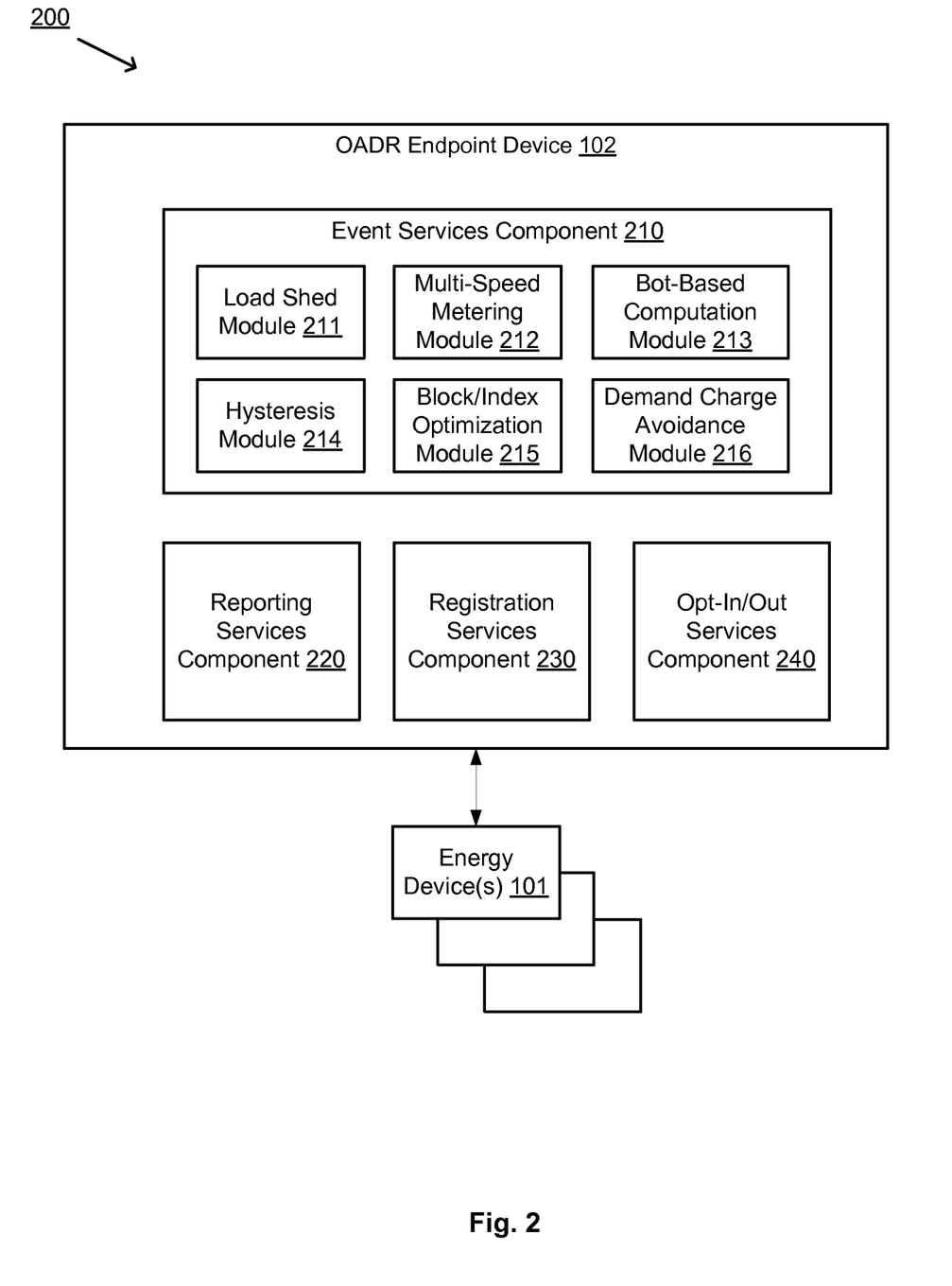
FIG. 2 is a block diagram illustrating a client-side system architecture for an OADR endpoint device communicably coupled to energy devices, in accordance with implementations of the disclosure.

FIG. 2 is a block diagram illustrating client-side system architecture 200 for an OADR endpoint device 102 communicably coupled to energy devices 101, in accordance with implementations of the disclosure. OADR endpoint device 102 and energy devices 101 are the same as their counterparts described with respect to FIG. 1. In one implementation, the OADR endpoint device 102 can support event services, reporting services, registration services, and opt in/out status services. The OADR endpoint device 102 can support these services by implementing, for example, standard OADR 2.0b profile specifications. In some implementations, OADR endpoint device 102 is capable of communicating via other protocols and specification, and is not limited to communications via OADR.

OADR endpoint device 102 may include an event services component 210 to provide event services. The event services can include, but are not limited to, supporting many different signaling options, including energy price conveyance and device control parameters that permit signaling of shed strategies based on a percentage up or down, and shed to a baseline. In some implementations, event services component 210 may include a load shed module 211, a multi-speed metering module 212, a bot-based computation module 213, a hysteresis module 214, a block/index optimization module 215, and a demand charge avoidance module 216.

The load shed module 211 may support the prediction of cost savings for a load shed. Load shed predictions are based on one or more commitments made by customers as part of a program enrollment process and a current customer opt-in or opt-out state to the commitments. The commitments may include, but are not limited to, a guaranteed load drop, a firm service level, a historical non-temperature dependency, and a historical temperature dependency. The guaranteed load drop may refer to a contractual commitment to curtail energy consumption by a certain amount. The firm service level may refer a contractual commitment to maintain energy consumption at or below a certain amount. The historical non-temperature dependency may refer to observational data based on a customer's historical energy use. Lastly, the historical temperature dependency may refer to observational data based on a customer's historical energy use, normalized for temperature use.

In one implementation, the multi-speed metering module 212 permits variable metering resolution. The OADR endpoint device 102 can shift its sampling rate from low-rate to high-rate during demand response (DR) events. As the OADR endpoint device 102 is aware of when a DR event is coming, it can modify the sampling rate of the OADR endpoint device 102 appropriately to capture the "shoulders" (e.g., estimated beginning and ends) of an event. As such, the OADR endpoint device 102 delivers high-resolution energy consumption details for the periods of a DR event, while capturing and delivering less data outside of the DR event windows. As a result, an inefficient data trap can be avoided.

The bot-based computation module 213 may implement real-time signal processing at the client level (i.e., at the OADR endpoint device 102), thereby using each OADR endpoint device 102 to perform calculations locally. This distributed computing model allows a real-time information process to produce local load shed decisions in real-time (vs. the server-based once per day or similar model). This approach is also used to optimize response times by regulation and storage devices without utilizing a "round trip" to the VTN (e.g., OADR server 120).

In one implementation, the hysteresis module 214 may be used to determine when an OADR endpoint device 102 initiates an economic load shed event and when the OADR endpoint device 102 recovers from the event. In some implementations, pricing logic of the OADR endpoint device 102 can utilize the principals of hysteresis to determine when to shed load. Hysteresis is an engineering principal that includes the history of past inputs in addition to the current input to determine the output. The use of hysteresis can prevent rapid transitions back and forth around a set point. In an implementation, the pricing logic can include parameters such as shed price, delay off, mandatory time off, return price, and delay on. The use of non-zero values for delays and a gap between shed and return price can allow the OADR endpoint device 102 to make deliberate shed and return decisions, thereby preventing damage to the controlled equipment.

The block and index module 215 may be used to monitor performance of a facility against contract values, and cause an economic load shed when those values are exceeded. The OADR endpoint device 102 continually monitors both the current price of energy and real time consumption. If the OADR endpoint device 102 determines that a customer is projected to exceed a block of allotted energy, it checks the current index price (i.e., current real-time energy price). If the price is above the threshold level, the OADR endpoint device 102 implements a load shed based on the available shed amount, the time remaining in the block, and the predicted overage.

The demand charge avoidance module 217 may be used to avoid peak demand charges. The OADR endpoint device 102 continually monitors both the current price of energy and real-time consumption at the OADR endpoint device 102. Peak demand charges are incurred when customers exceed a consumption threshold. By shedding load when the customer nears a historical peak corresponding to the customer, the OADR endpoint device 102 can prevent these charges.

OADR endpoint device 102 may include a reporting services component 220 to provide reporting services. The reporting services can include, but are not limited to, an ability to report periodic or one-time information on the state of a load or generation asset. This service may be used to return telemetry data reports to OADR server 120. In one implementation, reports are returned to the server or VTN using, for example, a reporting web service, such as EiReport web service described in the OADR 2.0b specification.

OADR endpoint device 102 may include a registration services component 230 to provide registration services. The registration services can include, but are not limited to, automatically registering the OADR endpoint device 102 with the OADR server 120 to identify and receive information. The registration process is handled via a web service, such as the EiRegisterParty web service described in the OADR 2.0b specification.

OADR endpoint device 102 may include an opt-in/out services component 240 to provide opt-in/out services. The opt-in/out status services can include, but are not limited to, sending opt-in/opt-out signals in response to an event signals. For example, the OADR endpoint device 102 may generate and communicate opt-in and opt-out schedules to the OADR server 120. These schedules may define temporary changes in availability of signaled assets, and may be combined with longer term availability schedules to give a complete picture of the willingness of the energy device 101 and/or client site 130 to respond to even messages received by the OADR endpoint device 102. Exchange of scheduling data with the server is handled via a web service, such as the EiOpt web service described in the OADR 2.0b specification.

In some implementations, the OADR endpoint device 102 can enable facilities to participate in utility or other energy service provider (ESP) programs. However, customers may also want access to the same meter data being reported to the utility. This feature is not supported in the standard OADR 2.0 protocol. In an implementation, the OADR server 120 can be configured to allow facility mangers to access that telemetry information (e.g., meter data being reported to the utility) and can allow for monitoring and managing their operations through the same OADR endpoint device 102 device, exceeding the specifications of the existing OADR2.0b profile.

Referring back to FIG. 1, the OADR endpoint device 102 can communicate in a highly-secure manner as specified in, for example, the OADR 2.0b profile. The OADR endpoint device 102 can periodically poll the OADR server 120 to exchange information about DR events, energy prices and telemetry data. Advanced secure web services allows for integration into legacy systems. In some implementations, the system 100 can monitor status, restart hardware services, change OADR server 120 and OADR endpoint device 102 parameters and settings and update software remotely. System 100 may also monitor energy usage via utility meter or sub meters per location, view all locations from a single portal, or curtail consumption automatically due to high energy prices, energy provider program calls and to avoid peak demand charges. In an implementation, the OADR endpoint device 102 can be a cloud-based VEN gateway with an application to incorporate Representational State Transfer (REST)/JavaScript Object Notation (JSON)-based web services.

In one implementation, the OADR server 120 can support, via web portal, event notifications, preschedule controls, and opt in/out status. The OADR server 120 can support event notifications and opt-in/out by implementing standard OADR 2.0b profile specifications. In some implementations, OADR server 120 is capable of communicating via other protocols and specification, and is not limited to communications via OADR. The OADR server 120 can then extend the capabilities of a certified server (e.g., a Virtual Top Node or VTN) by presenting both notification and schedule data to users via a web portal. Event notifications can also include future events. Once available on the OADR server 120, these future events can be used to send pre-schedule controls (e.g., pre-chilling of freezer spaces, pre-cooling of building spaces, etc.) to OADR endpoint device 102. These preschedule controls can also be available for inspection by users through the web portal. Users of OADR server 120 may also subscribe to email and short message system (SMS) alerts of various system actions, including demand response (DR) events and pricing events.

In one implementation, the OADR server 120 can identify peak demand-causing behaviors, detect unplanned usage due to employee behaviors, and compare consumption among like facilities. For example, the OADR server 120 can collect telemetry data from meters and sub-meters in connection with the OADR endpoint device 102 and energy devices 101 at a facility, and can array the meter data in a number of dashboard views. By charting power consumption over time from one or more meters being sampled, the OADR server 120 can identify outlying observations that may represent equipment cycling on (or off) at inappropriate times. Likewise, the OADR server 120 can support inter-facility comparisons so that building managers can compare buildings thought to be similar in design to see if their "real world" behavior is also similar. A number of measures of correlation can be made available in the dashboard to further assist building managers in identifying buildings behaving in similar fashion.

In an implementation, the OADR server 120 can decrease the complexity of receiving messages from utility providers by implementing a standard protocol—e.g., OADR 2.0b—for the conveyance of energy market information. The focus on a standard for transmission and receipt of basic market signals can permit more development time (and implementation resources) to be used in leveraging market signals in ways that can be useful to facility managers, rather than spending time in multiple implementations of data transmission software (e.g., one for each utility).

In an implementation, the OADR server 120 can allow a pricing signal to be mapped to an OADR endpoint device 102 and can direct updates to the OADR endpoint device 102 when the data changes. The system can support OADR 2.0b enhanced Energy Interoperation event (EiEvent) service objects for price conveyance. As such, price data can be transferred from the OADR server 120 to OADR endpoint device 102 or an OADR endpoint device 102 resource. In an implementation, the system 100 can facilitate the conveyance of price data by permitting OADR endpoint device 102 to be associated with the price feed from the OADR server 120. These feeds may include current day and next day prices and can be used by an appropriately programmed VEN or building management system (BMS) to respond to "real world" price events in real-time.

In an implementation, the system 100 can allow operators to custom configure program parameters to optimize and minimize energy consumption. For example, parameters such as number of calls per season, minimum notification time, maximum duration, event type, scale, etc., can be automatically entered into the event screen. When the maximum number of calls is exceeded, the system can be configured to display only the remaining VEN's. These are VEN's that were not previously called due to locational DR or had opted out of earlier events. This feature allows the maximum usage of a program's enrolled facility resources.

In some implementations, the pricing logic of the system 100 can utilize the principals of hysteresis to determine when to shed load. Hysteresis is an engineering principal that includes the history of past inputs in addition to the current input to determine the output. The use of hysteresis can prevent rapid transitions back and forth around a set point. In an implementation, the pricing logic can include parameters such as shed price, delay off, mandatory time off, return price, and delay on. The use of non-zero values for delays and a gap between shed and return price can allow the VEN to make deliberate shed and return decisions, thereby preventing damage to the controlled equipment.

Figure 3:
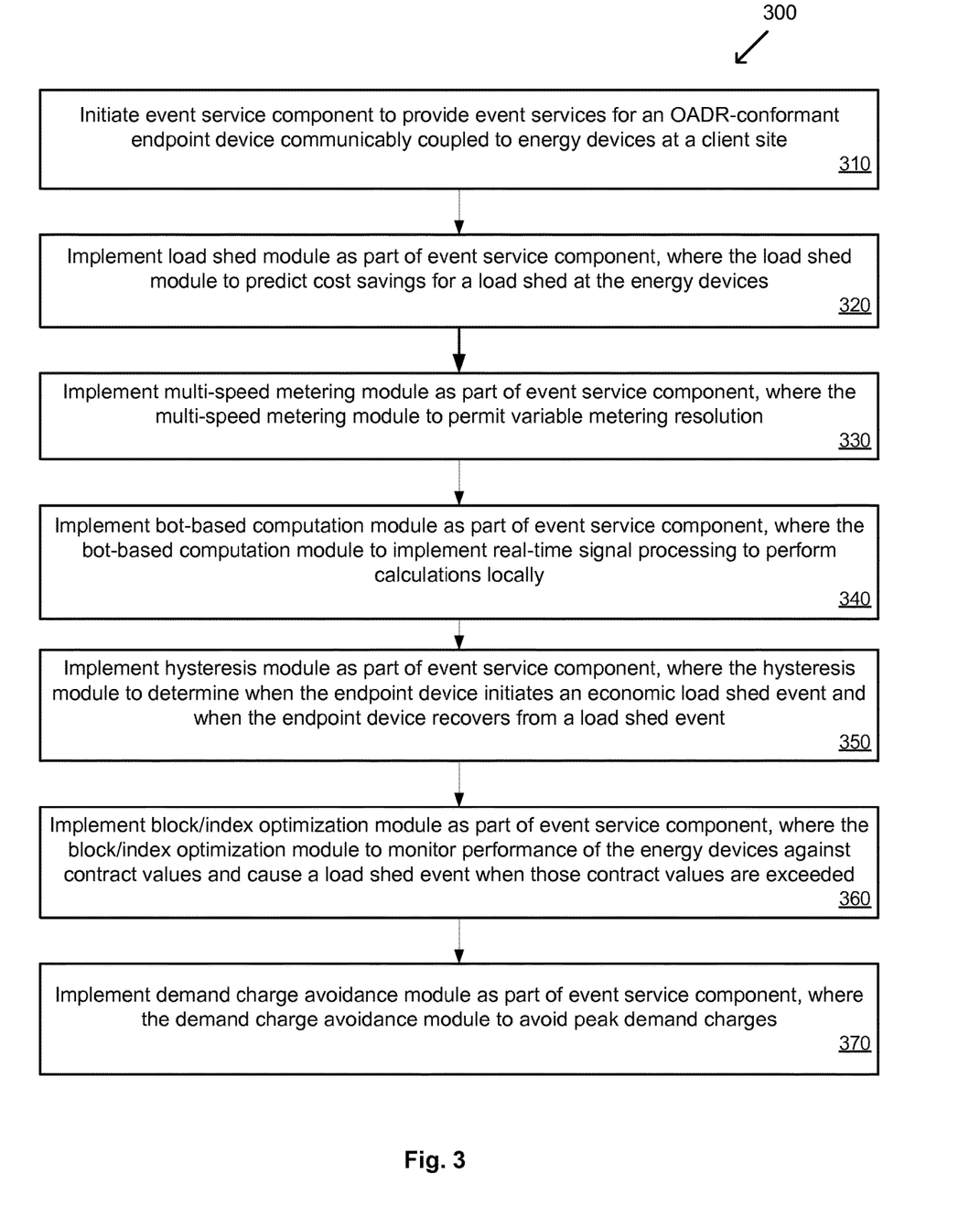
FIG. 3 is a flow diagram of a method for implementing event services at an OADR-compliant endpoint device in accordance with implementations of the disclosure.

FIG. 3 is a flow diagram illustrating a method 300 for implementing event services at an OADR-compliant endpoint device, according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by OADR endpoint device 102 of FIGS. 1 and 2.

Method 300 begins at block 310 where an event service component is initiated at an OADR-conformant endpoint device. The event services component is to provide event services for the endpoint device, which is coupled to energy devices at a client site. At block 320, a load shed module is implemented as part of the service component. The load shed module may predict cost savings for a load shed event at the energy devices. Then, at block 330, a multi-speed metering module is implemented as part of the service component. The multi-speed metering module may permit variable metering resolution at the OADR-conformant endpoint device.

Subsequently, at block 340, a bot-based computation module is implemented as part of the service component. The bot-based computation module may implement real-time signal processing to perform calculations locally at the OADR-conformant endpoint device. At block 350, a hysteresis module is implemented as part of the service component. The hysteresis module may determine when the endpoint device initiates an economic load shed event and, correspondingly, when the endpoint device can recover from a load shed event.

Then, at block 360, a block/index optimization module is implemented as part of the service component. The block/index optimization module may monitor performance of the energy devices against contract values and cause a load shed event when those contract values are exceeded. Lastly, at block 370, a demand charge avoidance module is implemented as part of the service component. The demand charge avoidance module may avoid peak demand charges caused by the energy devices at the client site.

Figure 4:
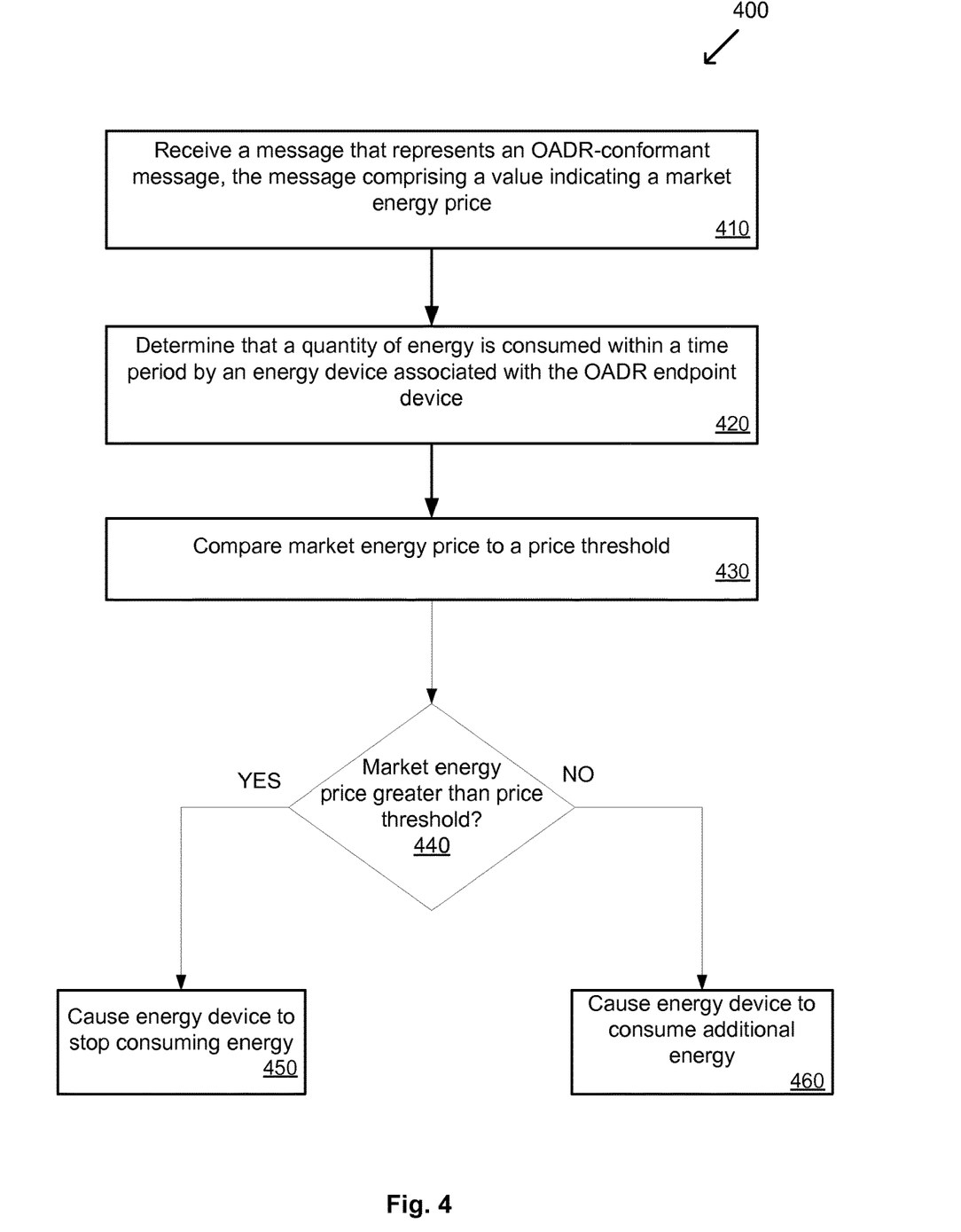
FIG. 4 is a flow diagram of a method for an OADR endpoint device in accordance with implementations of the disclosure.

FIG. 4 is a flow diagram illustrating a method 400 for providing energy signaling by an OADR endpoint device according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by OADR endpoint device 102 of FIGS. 1 and 2.

Method 400 begins at block 410 where a message is received that represents an OADR-conformant message. The message may include a value indicating a market energy price. In one implementation, the message is received from an OADR server communicably coupled to the OADR endpoint device. At block 420, it is determined that a quantity of energy is consumed within a time period by an energy device associated with the OADR endpoint device. Then, at block 430, the market energy price is compared to a threshold price.

At decision block 440, it is determined whether the market energy price is greater than the price threshold. If so, the OADR endpoint device causes the energy device to stop consuming energy at block 450. The actual shed may be implemented in a number of ways, for example, by using an OADR endpoint device relay to bring a point monitored by an energy control system high, thus causing a device to be turned off, by directly signaling a load control device, or, if Modbus or other similar protocols are used, setting the value of a register or coil to a value meaningful to an energy control system high such that a device is turned off.

On the other hand, if the market energy price is not greater than the price threshold, then the OADR endpoint device may cause the energy device to consume additional energy, if possible, at block 460. A signal to consume additional energy, may be implemented in a number of ways, for example, by using an OADR endpoint device relay to bring a point monitored by an energy control system high, thus causing additional equipment to be brought online, by directly signaling a variable frequency device (VFD) to change its frequency, thus consuming more energy, or, if Modbus or other similar protocols are used, setting the value of a register or coil to a value meaningful to an energy control system high such that a device is turned on.

Figure 5:
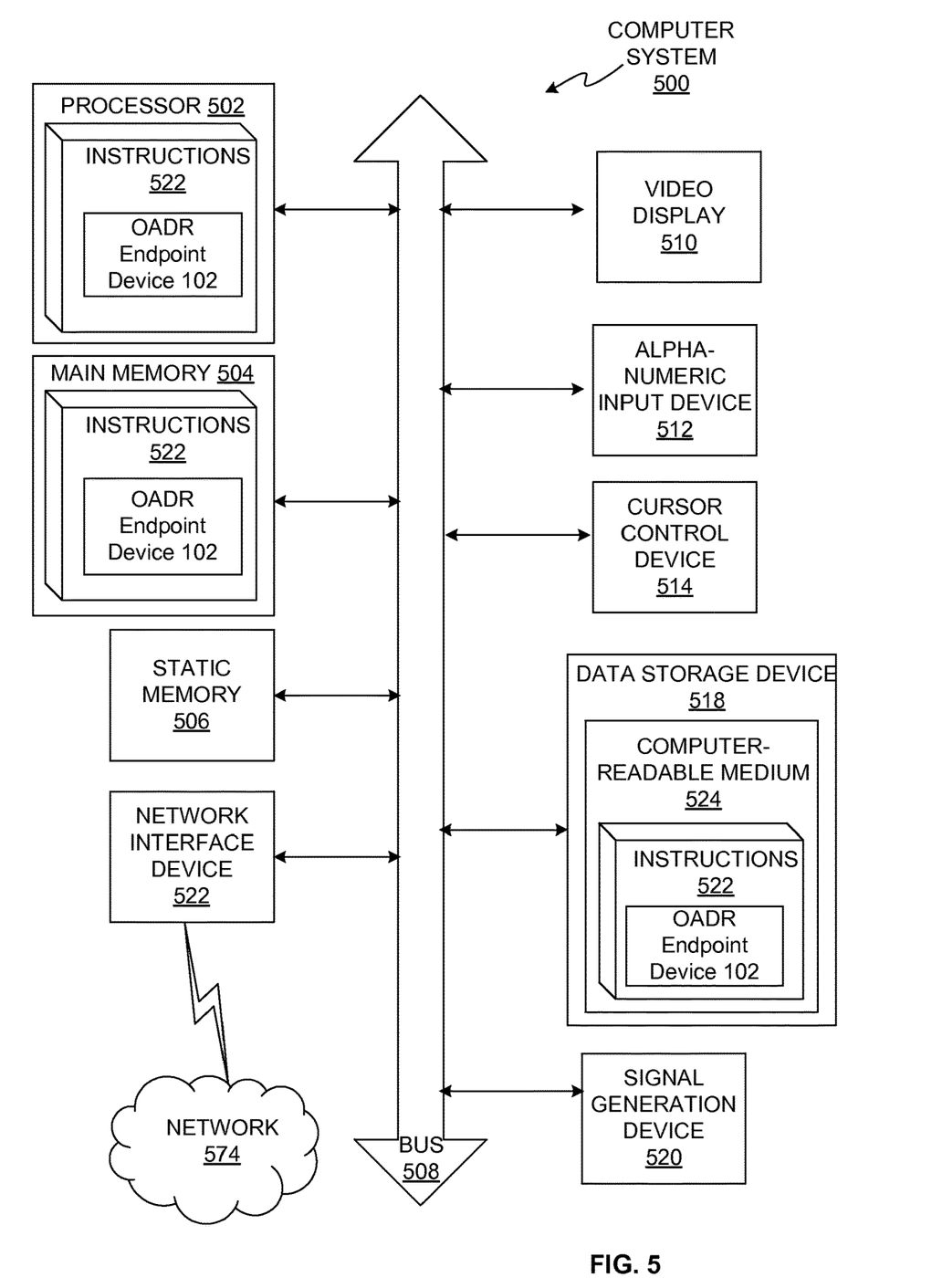
FIG. 5 is a block diagram of a computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 500 may be representative of an OADR endpoint device 102, or may execute the OADR endpoint device 102, as described with respect to FIGS. 1 and 2.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528, on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-readable storage media. The instructions 522 may further be transmitted or received over a network 574 via the network interface device 522.

The machine-readable storage medium 528 may also be used to store instructions to perform a method for implementing an OADR endpoint device, as described herein. While the machine-readable storage medium 528 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:

receiving, by a processing device of an endpoint device, a first message comprising a first market energy price;

determining whether a first quantity of energy has been consumed within a first time period by at least one energy device associated with the endpoint device, the first quantity of energy being based on temperature dependent historical energy use by a customer associated with the at least one energy device, and the temperature dependent energy use being normalized for temperature use by the customer, wherein the first quantity of energy is predicted based at least in part on a contractual commitment to curtail energy consumption by a specific amount by a customer associated with the residential energy-consuming devices as part of a program enrollment process;

responsive to a determination that the first quantity of energy has been consumed by the at least one energy device within the first time period, determining whether the first market energy price is greater than a price threshold; and responsive to a determination that the first market energy price is greater than the price threshold, causing the at least one energy device to stop consuming additional amounts of energy, wherein causing the at least one energy device to stop consuming the additional amounts of energy comprises:

utilizing a relay to bring a point monitored by an energy control system above an allowed energy usage threshold;

signaling a load control device corresponding to the at least one of the residential energy-consuming devices; or setting a value of a register or coil to a value to turn the at least one of the residential energy-consuming devices off.

2. The method of claim 1, further comprising:

determining an amount of time remaining in the first time period;

determining whether the amount of time remaining in the first time period is greater than a remaining time threshold; and responsive to a determination that the amount of time remaining in the first time period is greater than the remaining time threshold, causing the at least one energy device to stop consuming additional amounts of energy.

3. The method of claim 1, further comprising:

determining a predicted amount of energy for the at least one energy device for a remaining portion of the first time period;

determining whether the predicted amount of energy for the at least one energy device for the remaining portion of the first time period is greater than an energy consumption threshold; and responsive to a determination that the predicted amount of energy required by the at least one energy device for the remaining portion of the first time period is greater than the energy consumption threshold, causing the at least one energy device to stop consuming additional amounts of energy.

4. The method of claim 3, wherein causing the at least one energy device to stop consuming additional amounts of energy further comprises at least one of:

utilizing a relay to bring a point monitored by an energy control system high, thus causing additional equipment to be brought online;

signaling a variable frequency device to change its frequency; or setting a value of a register or coil to a value to turn the at least one energy device on.

5. The method of claim 1, further comprising:

receiving a temperature reading external to the at least one energy device;

determining whether the temperature reading is below a temperature threshold; and responsive to a determination that the temperature reading is below the temperature threshold, causing the at least one energy device to stop consuming additional amounts of energy.

6. The method of claim 1, further comprising:

receiving a second message comprising a second market energy price;

determining whether a difference between the first market energy price and the second market energy price exceeds a price delta threshold; and responsive to a determination that the difference between the first market energy price and the second market energy price exceeds a price delta threshold, receiving a third message comprising a third market energy price in a time period that is less than a duration of a time period between receiving the first message comprising the first market energy price and the second message comprising the second market energy price.

7. The method of claim 1, further comprising:

responsive to a determination that the first market energy price is greater than or equal to the price threshold:

determining a predicted cost avoidance associated with the at least one energy device;

storing the predicted cost avoidance; and determining whether a second quantity of energy has been consumed by the least one energy device within a second time period; and responsive to a determination that the second quantity of energy has been consumed by the least one energy device within the second time period:

causing the at least one energy device to stop consuming additional amounts of energy in view of the stored predicted cost avoidance associated with the at least one energy device.

8. The method of claim 1, further comprising:

sending a message to a server device comprising an indication that the at least one energy device has stopped consuming additional amounts of energy.

9. The method of claim 1, wherein the first message is an Open Automatic Demand Response (OADR) conforming message.

10. The method of claim 1, further comprising:

responsive to a determination that the first market energy price is less than the price threshold, causing the at least one energy device to consume additional amounts of energy.

11. A system comprising:

a memory;

a processing device of an endpoint device communicably coupled to the memory; and an Open Automatic Demand Response (OADR) energy management data program (EMDP) executable from the memory by the processing device, the OADR EMDP to:
receive a first message comprising a first market energy price;
determine whether a first quantity of energy has been consumed within a first time period by at least one energy device associated with the endpoint device, the first quantity of energy being based on temperature dependent historical energy use by a customer associated with the at least one energy device, and the temperature dependent energy use being normalized for temperature use by the customer, wherein the first quantity of energy is predicted based at least in part on a contractual commitment to curtail energy consumption by a specific amount by a customer associated with the residential energy-consuming devices as part of a program enrollment process;
responsive to a determination that the first quantity of energy has been consumed by the at least one energy device within the first time period, determine whether the first market energy price is greater than a price threshold; and
responsive to a determination that the first market energy price is greater than the price threshold, causing the at least one energy device to stop consuming additional amounts of energy, wherein causing the at least one energy device to stop consuming the additional amounts of energy comprises:
utilizing a relay to bring a point monitored by an energy control system above an allowed energy usage threshold;
signaling a load control device corresponding to the at least one of the residential energy-consuming devices; or
setting a value of a register or coil to a value to turn the at least one of the residential energy-consuming devices off.

12. The system of claim 11, further comprising:
determining an amount of time remaining in the first time period;
determining whether the amount of time remaining in the first time period is greater than a remaining time threshold; and
responsive to a determination that the amount of time remaining in the first time period is greater than the remaining time threshold, causing the at least one energy device to stop consuming additional amounts of energy.

13. The system of claim 11, further comprising:
determining a predicted amount of energy for the at least one energy device for a remaining portion of the first time period;
determining whether the predicted amount of energy for the at least one energy device for the remaining portion of the first time period is greater than an energy consumption threshold; and
responsive to a determination that the predicted amount of energy required by the at least one energy device for the remaining portion of the first time period is greater than the energy consumption threshold, causing the at least one energy device to stop consuming additional amounts of energy.

14. The system of claim 11, further comprising:
responsive to a determination that the first market energy price is less than the price threshold, causing the at least one energy device to consume additional amounts of energy.

15. The system of claim 14, wherein causing the at least one energy device to stop consuming additional amounts of energy further comprises at least one of:
utilizing a relay to bring a point monitored by an energy control system high, thus causing additional equipment to be brought online;
signaling a variable frequency device to change its frequency; or
setting a value of a register or coil to a value to turn the at least one energy device on.

16. A non-transitory computer-readable storage medium comprising instructions that, when executed by a processing device, causes the processing device to:
receive, by the processing device of an endpoint device, a first message comprising a first market energy price;
determine whether a first quantity of energy has been consumed within a first time period by at least one energy device associated with the endpoint device, the first quantity of energy being based on temperature dependent historical energy use by a customer associated with the at least one energy device, and the temperature dependent energy use being normalized for temperature use by the customer, wherein the first quantity of energy is predicted based at least in part on a contractual commitment to curtail energy consumption by a specific amount by a customer associated with the residential energy-consuming devices as part of a program enrollment process;
responsive to a determination that the first quantity of energy has been consumed by the at least one energy device within the first time period, determine whether the first market energy price is greater than a price threshold; and
responsive to a determination that the first market energy price is greater than the price threshold, cause the at least one energy device to stop consuming additional amounts of energy wherein causing the at least one energy device to stop consuming the additional amounts of energy comprises:
utilizing a relay to bring a point monitored by an energy control system above an allowed energy usage threshold;
signaling a load control device corresponding to the at least one of the residential energy-consuming devices; or
setting a value of a register or coil to a value to turn the at least one of the residential energy-consuming devices off.

17. The non-transitory computer-readable storage medium of claim 16, wherein the processing device is further to:
receiving a second message comprising a second market energy price;
determining whether a difference between the first market energy price and the second market energy price exceeds a price delta threshold; and
responsive to a determination that the difference between the first market energy price and the second market energy price exceeds a price delta threshold, receiving a third message comprising a third market energy price in a time period that is less than a duration of a time period between receiving the first message comprising the first market energy price and the second message comprising the second market energy price.

18. The non-transitory computer-readable storage medium of claim 16, wherein the processing device is further to:
responsive to a determination that the first market energy price is greater than or equal to the price threshold:
determining a predicted cost avoidance associated with the at least one energy device;
storing the predicted cost avoidance; and
determining whether a second quantity of energy has been consumed by the least one energy device within a second time period; and
responsive to a determination that the second quantity of energy has been consumed by the least one energy device within the second time period:
causing the at least one energy device to stop consuming additional amounts of energy in view of the stored predicted cost avoidance associated with the at least one energy device.

19. The non-transitory computer-readable storage medium of claim 16, wherein the processing device is further to:
determine an amount of time remaining in the first time period;
determine whether the amount of time remaining in the first time period is greater than a remaining time threshold; and
responsive to a determination that the amount of time remaining in the first time period is greater than the remaining time threshold, cause the at least one energy device to stop consuming additional amounts of energy.

20. The non-transitory computer-readable storage medium of claim 16, wherein the processing device is further to:
determine a predicted amount of energy for the at least one energy device for a remaining portion of the first time period;
determine whether the predicted amount of energy for the at least one energy device for the remaining portion of the first time period is greater than an energy consumption threshold; and
responsive to a determination that the predicted amount of energy required by the at least one energy device for the remaining portion of the first time period is greater than the energy consumption threshold, cause the at least one energy device to stop consuming additional amounts of energy.

21. The non-transitory computer-readable storage medium of claim 16, wherein the processing device is further to:
responsive to a determination that the first market energy price is less than the price threshold, causing the at least one energy device to consume additional amounts of energy.

22. The non-transitory computer-readable storage medium of claim 16, wherein the processing device is further to:
receiving a temperature reading external to the at least one energy device;
determining whether the temperature reading is below a temperature threshold; and
responsive to a determination that the temperature reading is below the temperature threshold, causing the at least one energy device to stop consuming additional amounts of energy.

* * * * *